(12) United States Patent
Yamakawa

(10) Patent No.: US 11,186,449 B2
(45) Date of Patent: Nov. 30, 2021

(54) GRIPPING METHOD AND COMPONENT

(71) Applicant: KYOCERA Document Solutions Inc., Osaka (JP)

(72) Inventor: Tomohiko Yamakawa, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/880,291

(22) Filed: May 21, 2020

(65) Prior Publication Data

US 2020/0377310 A1    Dec. 3, 2020

(30) Foreign Application Priority Data

May 31, 2019   (JP) .............................. JP2019-102594

(51) Int. Cl.
   *B65G 47/90*   (2006.01)
(52) U.S. Cl.
   CPC ................... *B65G 47/90* (2013.01)
(58) Field of Classification Search
   CPC ............... B65G 47/90; B65G 47/904
   USPC ............. 294/86.25, 86.3, 94, 101, 116, 197, 294/102.1, 103.1
   See application file for complete search history.

(56) References Cited

U.S. PATENT DOCUMENTS

| | | | | | |
|---|---|---|---|---|---|
| 2,059,483 | A | * | 11/1936 | Parsons | ..................... E04B 9/26 52/506.06 |
| 2,717,740 | A | * | 9/1955 | Maxk | ..................... E01B 13/02 238/327 R |
| 3,519,237 | A | * | 7/1970 | Dunn | ..................... B27B 31/06 248/327 |
| 3,780,923 | A | * | 12/1973 | Merola | ................. B25B 1/2473 226/151 |
| 4,128,986 | A | * | 12/1978 | Santarelli | ............... A01D 46/26 294/104 |
| 4,831,693 | A | * | 5/1989 | Veith | ....................... B25B 5/006 24/530 |
| 6,120,238 | A | * | 9/2000 | Nickel | ...................... B25B 5/08 294/104 |
| 2002/0149218 | A1 | * | 10/2002 | Gartner | .................. B65G 9/002 294/102.1 |
| 2017/0036612 | A1 | * | 2/2017 | Johnson | ................ B60R 9/0485 |

FOREIGN PATENT DOCUMENTS

JP    H07-241733 A    9/1995

* cited by examiner

*Primary Examiner* — Lynn E Schwenning
(74) *Attorney, Agent, or Firm* — Studebaker & Brackett PC

(57) ABSTRACT

A gripping method is for gripping an object using a gripping mechanism including a roller and a frame that houses the roller. The gripping method includes a first stage and a second stage. In the first stage, the gripping mechanism moves relative to the object such that a first portion of the object is gripped between an outer surface of the roller and an inner surface of the frame. In the second stage, the gripping mechanism further moves relative to the object such that the roller is lifted by a second portion of the object before gripping of the object is released.

2 Claims, 9 Drawing Sheets

GRIPPING METHOD AND COMPONENT

INCORPORATION BY REFERENCE

The present application claims priority under 35 U.S.C. § 119 to Japanese Patent Application No. 2019-102594, filed on May 31, 2019. The contents of this application are incorporated herein by reference in their entirety.

BACKGROUND

The present disclosure relates to a gripping method and a component.

A known assembly apparatus includes a chuck mechanism which grips a member to be conveyed. The chuck mechanism is an electric gripping mechanism. Other gripping mechanisms are known which use air suction or electric suction.

SUMMARY

A gripping method according to an aspect of the present disclosure is for gripping an object using a gripping mechanism including a roller and a frame that houses the roller. The gripping method includes a first stage and a second stage. In the first stage, the gripping mechanism moves relative to the object such that a first portion of the object is gripped between an outer surface of the roller and an inner surface of the frame. In the second stage, the gripping mechanism further moves relative to the object such that the roller is lifted by a second portion of the object before the gripping of the object is released.

A component according to an aspect of the present disclosure includes a component main body and a gripped section protruding from the component main body. The gripped section has a first portion and a second portion joined to the first portion. The first portion includes a part of a main surface of a plate with a constant thickness. The second portion has a thickness which increases along with distance from a point where the second portion is joined to the first portion.

DETAILED DESCRIPTION

Figure 1:
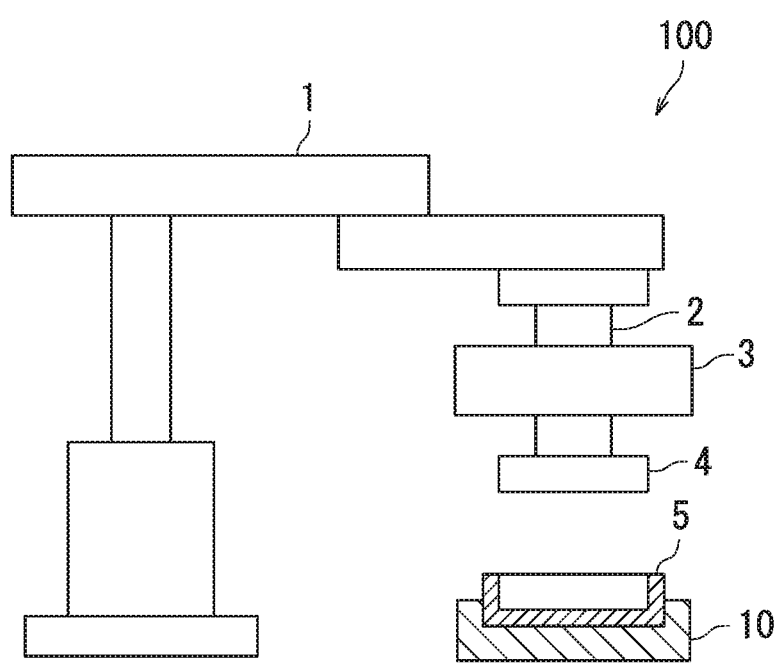
FIG. 1 is a diagram illustrating an example of an assembly apparatus in which a gripping method is applied according to an embodiment.
Figure 1:
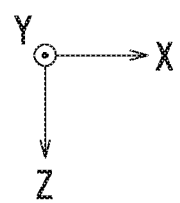
Figure 2:
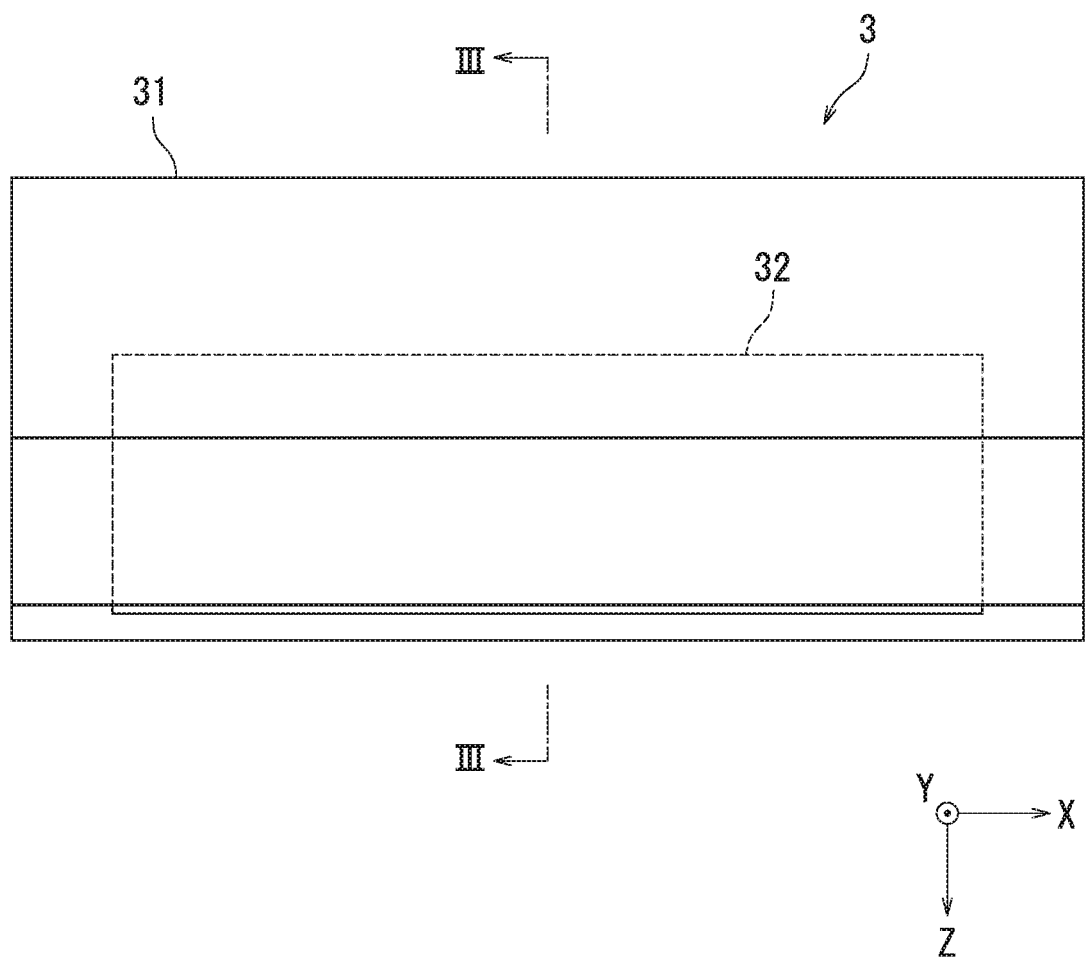
FIG. 2 is a front view of an example of a gripping mechanism.

The following describes an embodiment of the present disclosure with reference to FIGS. 1 to 7. In FIGS. 1 and 2, as a matter of convenience, a direction from the left to the right is referred to as a positive X axial direction, a direction from the back to the front is referred to as a positive Y axial direction, and a direction from up to down is referred to as a positive Z axial direction. Elements which are the same or equivalent are labeled with the same reference signs in the drawings and description thereof is not repeated.

First, an assembly apparatus 100 in which a gripping method is applied according to the embodiment is described with reference to FIG. 1. FIG. 1 is a diagram illustrating an example of the assembly apparatus 100.

As illustrated in FIG. 1, the assembly apparatus 100 is an apparatus which assembles by fitting a first component 4 to a second component 5. The assembly apparatus 100 includes a robot 1, a position correcting device 2, and a gripping mechanism 3.

The gripping mechanism 3 grips the first component 4. The position of the second component 5 is determined on a position determining mechanism 10. The first component 4 is equivalent to an example of a "component".

The position correcting device 2 corrects, relative to the second component 5, positional shift of the first component 4 gripped by the gripping mechanism 3. Specifically, the position correcting device 2 detects the direction of force exerted on the first component 4 during fitting of the first component 4 to the second component 5 and corrects a positional shift of the first component 4 according to the direction of the force.

The robot 1 moves the gripping mechanism 3 relative to the first component 4 and also moves the gripping mechanism 3 relative to the second component 5. Specifically, the robot 1 moves the gripping mechanism 3 to a storage location of the first component 4, grips the first component 4 with the gripping mechanism 3, and then moves the gripping mechanism 3 and the first component 4 to a point directly above the second component 5. Thereafter, the robot 1 fits the first component 4 to the second component 5 by moving the gripping mechanism 3 and the first component 4 in the positive Z axial direction. After fitting has been achieved, the robot 1 releases the first component 4 from the gripping of the gripping mechanism 3 and moves the gripping mechanism 3 in the negative Z axial direction.

Figure 3:
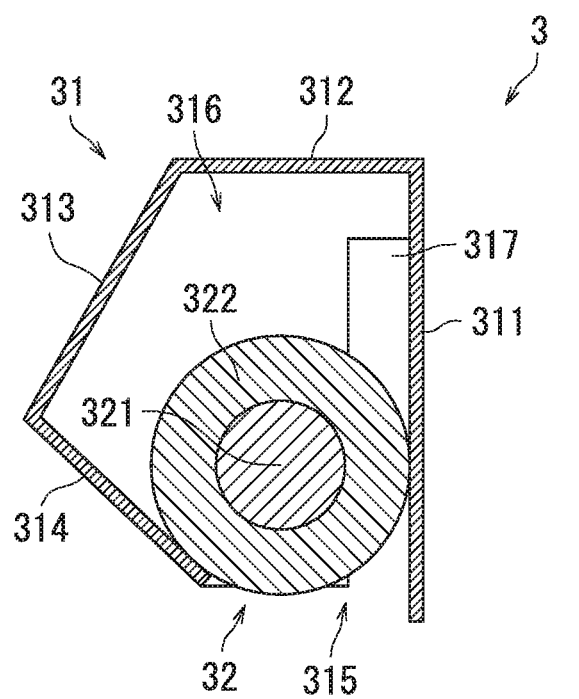
FIG. 3 is a cross-sectional view taken along a line III-III in FIG. 2.

Next, the gripping mechanism 3 is described with reference to FIGS. 2 and 3. FIG. 2 is a front view of an example of the gripping mechanism 3. FIG. 3 is a cross-sectional view taken along a line III-III in FIG. 2.

As illustrated in FIG. 2, the gripping mechanism 3 includes a holder 31 and a gripping roller 32. The longitudinal directions of the holder 31 and the gripping roller 32 are both parallel to the X axial direction. The holder 31 is equivalent to an example of a "frame". The gripping roller 32 is equivalent to an example of a "roller".

As illustrated in FIG. 3, the gripping roller 32 includes a cylindrical core 321 and a covering section 322 which covers the peripheral surface of the core 321. For example, the core 321 is made from a metal such as iron, and the covering section 322 is made from an elastic object such as polyacetal resin. The density of the core 321 is greater than the density of the covering section 322. The covering section 322 can be compressed and deformed. The friction coefficient of the peripheral surface of the covering section 322 is greater than the friction coefficient of the peripheral surface of the core 321.

As illustrated in FIG. 3, the holder 31 is a frame housing the gripping roller 32 and includes a back plate 311, a top plate 312, an upper front plate 313, a lower front plate 314, and left and right side plates 316. The holder 31 is made of a light metal such as aluminum, for example.

The back plate 311 is a rectangular plate extending along a ZX plane. The top plate 312 is a rectangular plate extending along a XY plane starting from an upper edge of the back plate 311. The upper front plate 313 is a rectangular plate extending diagonally downward in a direction away from the back plate 311 starting from the front edge of the top plate 312. The lower front plate 314 is a rectangular plate extending diagonally downward in a direction approaching the back plate 311 starting from the lower edge of the upper front plate 313.

An opening 315 is formed between the back plate 311 and the lower front plate 314. The width of the opening 315 in the Y axial direction is shorter than the diameter of the gripping roller 32. Accordingly, the gripping roller 32 does not fall through the opening 315. The back plate 311 and the lower front plate 314 support the weight of the gripping roller 32. The opening 315 can receive insertion of an object to be gripped.

The back plate 311, the top plate 312, the upper front plate 313, and the lower front plate 314 form substantially pentagonal openings on the left and right side surfaces of the holder 31. The left and right side plates 316 are located so as to cover the openings. However, at least one side plate 316 has a cutout 317 which allows passage of the object to be gripped but does not allow passage of the gripping roller 32 when gripping is released. The cutout 317 is positioned near the back plate 311.

By configuring a side plate 316 to be freely openable and closable for example, it is possible to insert and remove the gripping roller 32.

Figure 4:
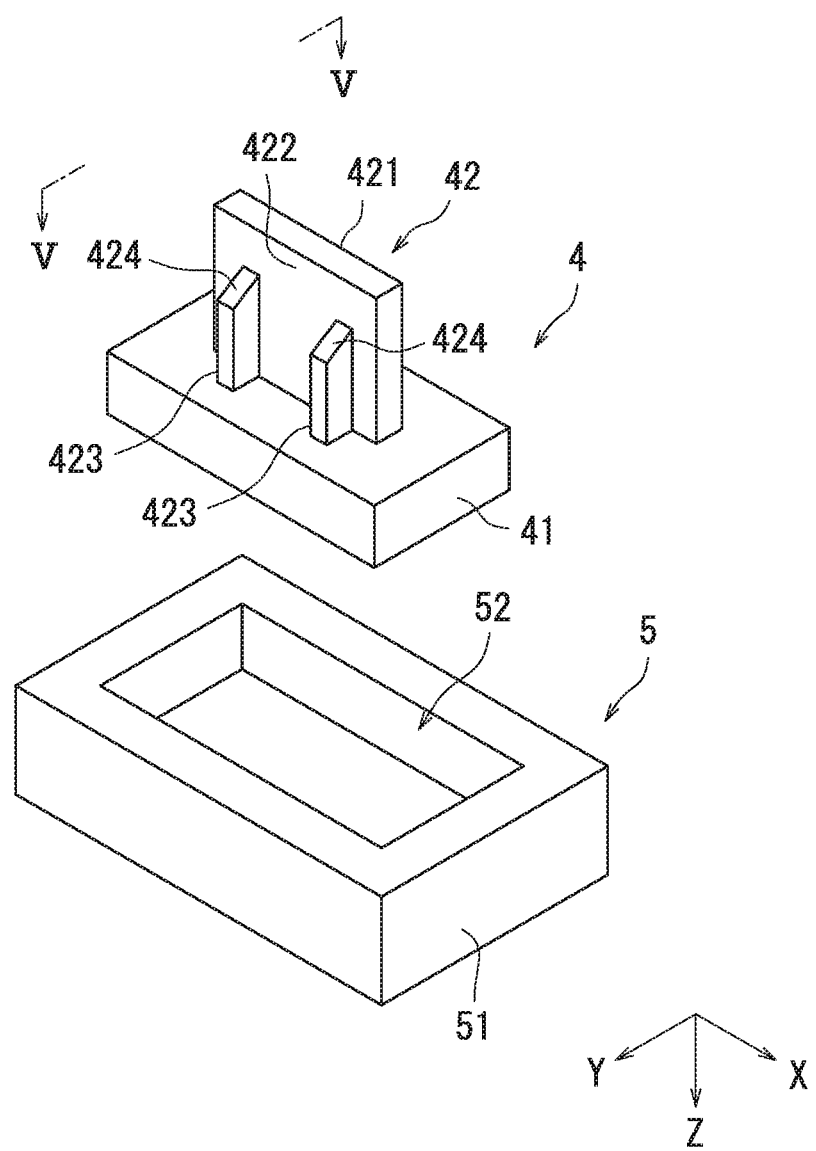
FIG. 4 is a perspective view of an example of a component according to the embodiment.
Figure 5:
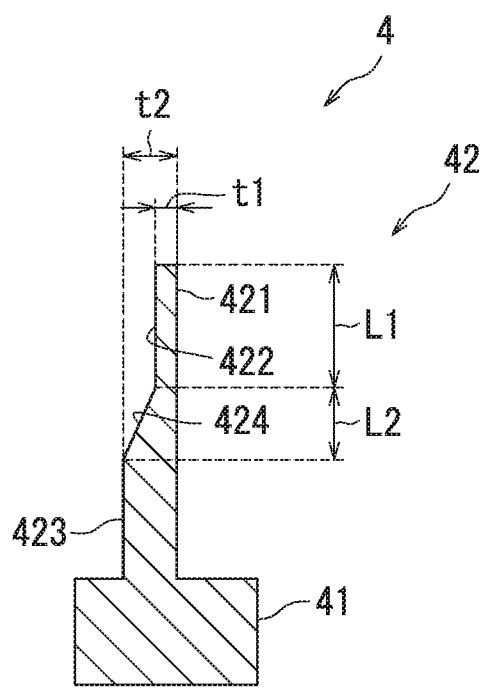
FIG. 5 is a cross-sectional view taken along a line V-V in FIG. 4.

Next, the first component 4 according to the embodiment is described with reference to FIGS. 4 and 5. FIG. 4 is a perspective view of an example of the first component 4. FIG. 5 is a cross-sectional view taken along a line V-V in FIG. 4.

As illustrated in FIG. 4, the first component 4 includes a component main body 41 and a gripped section 42. The component main body 41 has a substantially rectangular parallelepiped shape. The gripped section 42 protrudes from the component main body 41 so as to be easily gripped by the gripping mechanism 3. The gripped section 42 is rectangular plate-shaped and an end surface of the gripped section 42 is connected to one of the main surfaces of the component main body 41.

The gripped section 42 has a first main surface 421 and a second main surface 422. The first main surface 421 and the second main surface 422 extend along the ZX plane. The first main surface 421 is on a negative side in the Y axial direction, and the second main surface 422 is on a positive side in the Y axial direction.

The gripped section 42 further includes two ribs 423. The two ribs 423 are provided with a space therebetween in the X axial direction. Each rib 423 protrudes from the second main surface 422 in the positive Y axial direction. Each rib 423 has an end surface formed as an inclined surface 424 slanted toward the second main surface 422.

The second component 5 is formed with a recess 52 in a substantially rectangular parallelepiped-shaped component main body 51. The recess 52 receives insertion of the component main body 41 of the first component 4.

As illustrated in FIG. 5, the gripped section 42 includes a first portion L1 and a second portion L2. The first portion L1 includes an end on a negative side of the gripped section 42 in the Z axial direction. The second portion L2 is joined to the first portion L1. The first portion L1 includes a part of a main surface of a plate with a constant thickness t1, that is to say a part of the second main surface 422. The second portion L2 has a thickness t2 which increases along with distance from the point where the second portion L2 is joined to the first portion L1. The second portion L2 includes the inclined surfaces 424 formed on the ribs 423.

Figure 6:
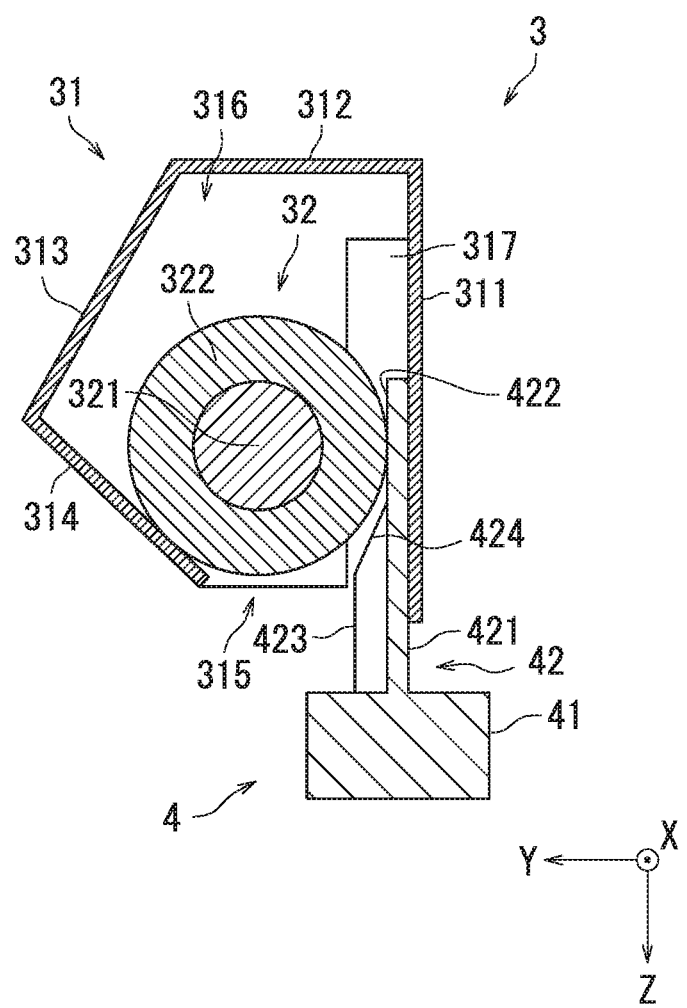
FIG. 6 is a cross-sectional view of a first stage of the gripping method.
Figure 7:
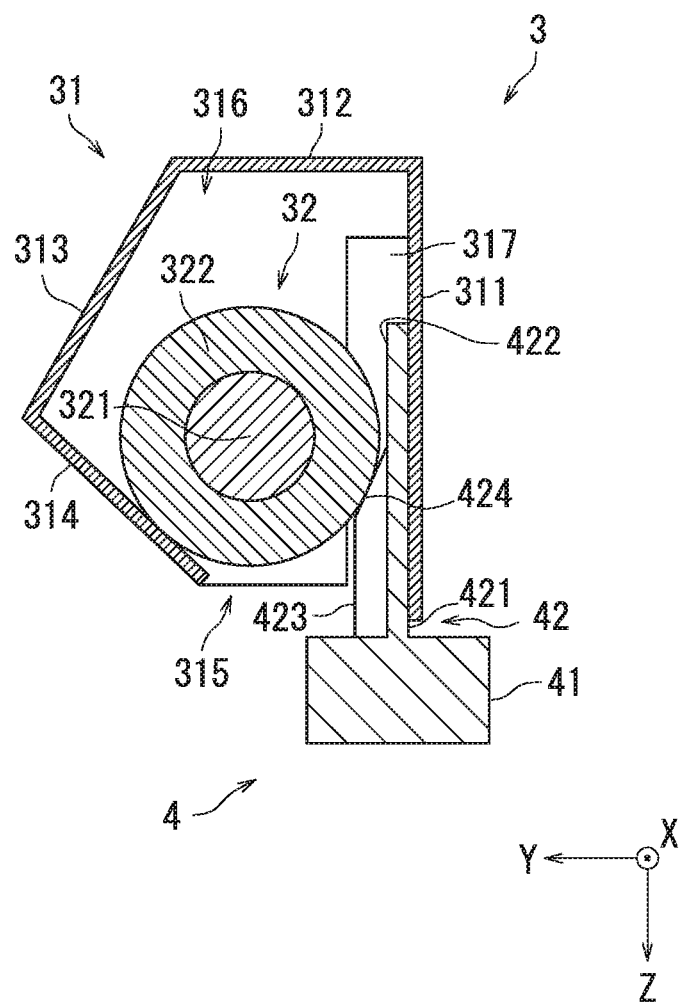
FIG. 7 is a cross-sectional view of a second stage of the gripping method.

Next, a gripping method according to the embodiment is described with reference to FIGS. 6 and 7. FIG. 6 is a cross-sectional view of a first stage of the gripping method. FIG. 7 is a cross-sectional view of a second stage of the gripping method.

In the first stage as illustrated in FIG. 6, the gripping mechanism 3 grips the first component 4 between the outer surface of the gripping roller 32 and an inner surface of the holder 31 using gravity acting on the gripping roller 32. Specifically, the second main surface 422 including the first portion L1 of the gripped section 42 is gripped with suitable frictional force between the outer surface of the covering section 322 and the inner surface of the back plate 311. Through the covering section 322 compressively deforming, great gripping force is realized because the covering section 322 has a larger surface area of contact with the gripped section 42 than in a case where the covering section 322 is formed with an inelastic material.

As illustrated in FIG. 7, the gripping mechanism 3 moves in the positive Z axial direction relative to the first component 4 before the first component 4 is released from gripping. The gripping method transitions from the first stage to the second stage. In the second stage, the gripping roller 32 is lifted by the inclined surfaces 424 of the ribs 423 composing the second portions L2 of the gripped section 42. As a result, the great gripping force is mitigated by the compressive deformation of the covering section 322.

The following describes operation of the assembly apparatus 100 with reference to FIGS. 1 to 7.

In a first process, the robot 1 moves the gripping mechanism 3 to the storage location of the first component 4 as illustrated in FIG. 1. Then, upon adjusting the posture of the gripping mechanism 3 such that the gripped section 42 is parallel to the back plate 311, the robot 1 moves the gripping mechanism 3 in the positive Z axial direction relative to the first component 4. The gripped section 42 is inserted into the holder 31 through the opening 315 and ascends within the holder 31 while pushing aside the gripping roller 32. Thereafter, the movement of the gripping mechanism 3 is halted before the inclined surfaces 424 push the gripping roller 32 upward. As a result, the first stage illustrated in FIG. 6 is realized.

In a second process, the robot 1 moves the gripping mechanism 3 in the negative Z axial direction. By further moving the gripping mechanism 3, the robot 1 conveys the first component 4 to a point directly above the second component 5 as illustrated in FIG. 1. The gripped section 42 is left gripped between the outer surface of the covering section 322 and the inner surface of the back plate 311.

In a third process, the robot 1 moves the gripping mechanism 3 in the positive Z axial direction. As a result, the first component 4 is fitted to the second component 5. The first stage illustrated in FIG. 6 is maintained at least until just before fitting.

In a fourth process, the robot 1 further moves the gripping mechanism 3 in the positive Z axial direction. Through the inclined surfaces 424 pushing the gripping roller 32 upward, the second stage illustrated in FIG. 7 is realized. The second stage is a preparation stage for gripping release.

In a fifth process, the robot 1 moves the gripping mechanism 3 in the positive X axial direction. The gripped section 42 slides between the outer surface of the covering section 322 and the inner surface of the back plate 311 and further passes through the cutout 317. As a result, the gripping of the first component 4 by the gripping mechanism 3 is released. The first component 4 is left fitted to the second component 5.

In a sixth process, the robot 1 moves the gripping mechanism 3 in the negative Z axial direction while returning the gripping mechanism 3 to the original position thereof in preparation for the next operation.

Figure 8:
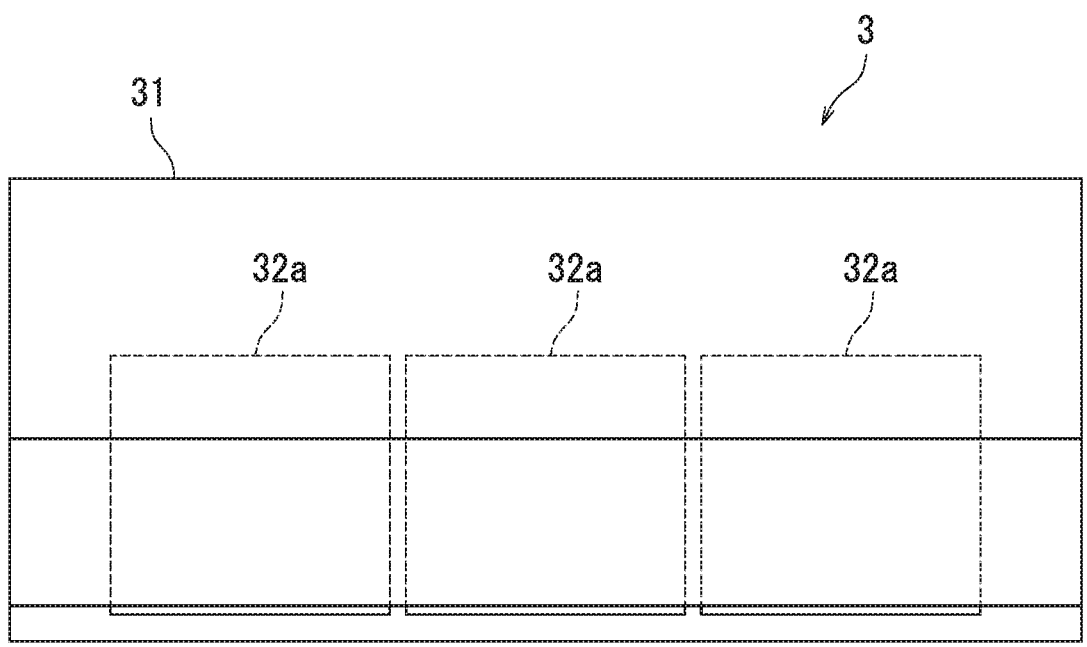
FIG. 8 is a front view of a variation of the gripping mechanism.
Figure 8:
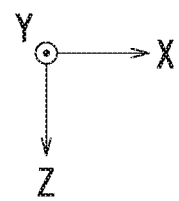

Next, a variation of the gripping mechanism 3 is described with reference to FIG. 8. FIG. 8 is a front view of the variation of the gripping mechanism 3.

The gripping mechanism 3 in FIG. 8 differs from the gripping mechanism 3 in FIG. 2 in that the holder 31 houses a plurality of gripping rollers 32a. In a case where the gripping rollers 32a have different weights, a plurality of gripping forces can be used. Furthermore, the peripheral surfaces of the gripping rollers 32a may have different friction coefficients.

Figure 9:
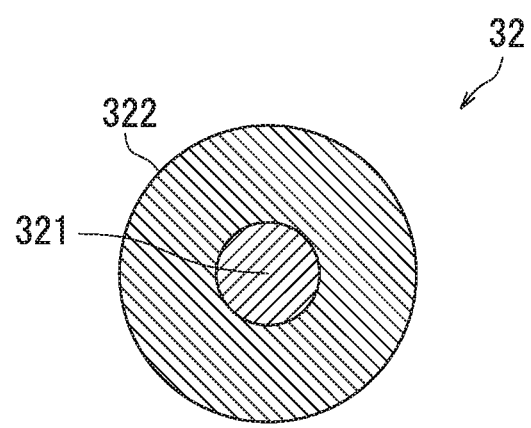
FIG. 9 is a cross-sectional view of an example of weight adjustment of a gripping roller.

Next, weight adjustment of the gripping roller 32 is described with reference to FIG. 9. FIG. 9 is a cross-sectional view of an example of the weight adjustment of the gripping roller 32.

The gripping roller 32 in FIG. 9 differs from the gripping roller 32 in FIG. 3 in that the diameter of the core 321 is reduced. Assuming the materials of the core 321 and the covering section 322 and the overall diameter of the gripping roller 32 are the same, the weight of the gripping roller 32 decreases as the diameter of the metal core 321 decreases. Conversely, the weight of the gripping roller 32 increases as the diameter of the metal core 321 increases. The weight of the gripping roller 32 may also be adjusted by changing the material of either or both of the core 321 and the covering section 322.

Figure 10:
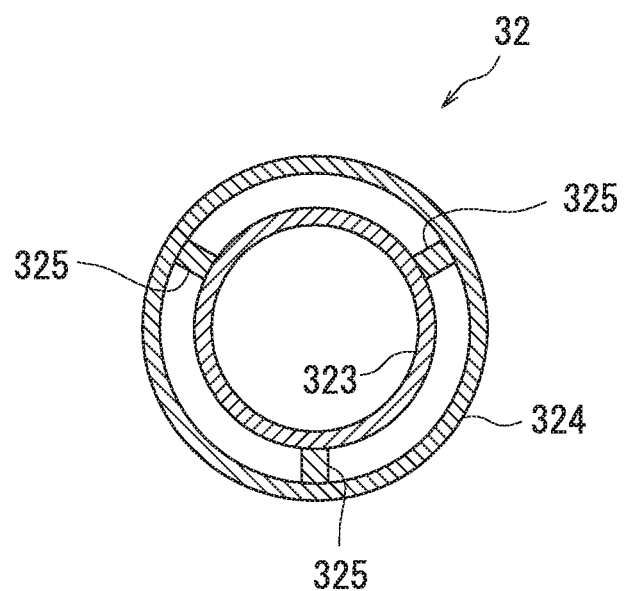
FIG. 10 is a cross-sectional view of a variation of the gripping roller.

Next, a variation of the gripping roller 32 is described with reference to FIG. 10. FIG. 10 is a cross-sectional view of a variation of the gripping roller 32.

The gripping roller 32 in FIG. 10 differs from the gripping rollers 32 in FIGS. 3 and 9 by including an inner ring 323, an outer ring 324, and cushion ribs 325. The inner ring 323 is a small-diameter cylinder and the outer ring 324 is a large-diameter cylinder. The cushion ribs 325 are located so as to connect the inner ring 323 and the outer ring 324 in three places. The three places at which the cushion ribs 325 are located are separated from each other by an approximately 120 degree angle. The inner ring 323, the outer ring 324, and the cushion ribs 325 are all made of an elastic material such as polyacetal resin. The gripping roller 32 in FIG. 10 is entirely compressively deformable and capable of realizing a great gripping force.

According to the embodiment, the gripping mechanism 3 which requires no motive power includes only the holder 31 and the gripping roller 32 (or 32a). As a result, the gripping mechanism 3 which is difficult to damage can be realized at low cost. Moreover, gripping is easily released because the ribs 423 with the inclined surfaces 424 are provided on the first component 4 which is an object to be gripped.

The description of the above embodiment is of an ideal embodiment of the present disclosure, and therefore includes various favorable technical limitations. However, the technical scope of the present disclosure is not limited to the embodiment unless specifically described as such. That is, elements of configuration in the above embodiment may be appropriately replaced with existing elements of configuration and the like, and a number of variations including other existing elements of configuration are possible. The description of the above embodiment does not limit the content of the disclosure described in the claims.

For example, in the embodiment as illustrated in FIG. 4, the number of the ribs 423 is two, but the present disclosure is not limited as such. The number of the ribs 423 may be one or three or more. In addition, the gripped section 42 may lack a rib structure and instead have a continuous inclined surface 424 across an entire side of the gripped section 42 in the X axial direction.

What is claimed is:

1. A gripping method for gripping an object using a gripping mechanism including a roller and a frame that houses the roller, the object including a component main body and a gripped section protruding from the component main body, the gripped section including a first portion and a second portion joined to the first portion, the first portion including a part of a main surface of a plate with a constant thickness, the second portion having a thickness which increases along with distance from a point where the second portion is joined to the first portion, the roller including an inner ring, an outer ring, and a plurality of ribs, the ribs being located so as to connect the inner ring and the outer ring in specific places, the gripping method comprising:

moving the gripping mechanism relative to the object such that the first portion of the object is gripped between an outer surface of the roller and an inner surface of the frame; and further moving the gripping mechanism relative to the object such that the roller is lifted by the second portion of the object before the gripping of the object is released.

2. The gripping method according to claim 1, wherein the inner ring, the outer ring, and the ribs of the roller are made of an elastic material.

* * * * *